US008610080B2

(12) United States Patent
Lyoussi et al.

(10) Patent No.: US 8,610,080 B2
(45) Date of Patent: Dec. 17, 2013

(54) METHOD FOR DETERMINING THE SPECTRAL AND SPATIAL DISTRIBUTION OF BRAKING PHOTONS, AND RELATED DEVICE

(75) Inventors: Abdallah Lyoussi, Manosque (FR); Emmanuel Payan, La Roque-d'Antheron (FR); Alain Mariani, Vinon sur Verdon (FR)

(73) Assignee: Commissariat a l'Energie Atomique et aux Energies Alternatives, Paris ( * ) Notice: Subject to any disclaimer, the term of this patent is extended or adjusted under 35 U.S.C. 154(b) by 40 days.

(21) Appl. No.: 13/139,700

(22) PCT Filed: Dec. 14, 2009

(86) PCT No.: PCT/EP2009/067048
§ 371 (c)(1),
(2), (4) Date: Jul. 22, 2011

(87) PCT Pub. No.: WO2010/069909
PCT Pub. Date: Jun. 24, 2010

(65) Prior Publication Data
US 2011/0266452 A1     Nov. 3, 2011

(30) Foreign Application Priority Data

Dec. 16, 2008  (FR) ...................................... 08 58641

(51) Int. Cl.
*G01T 3/00*     (2006.01)
(52) U.S. Cl.
USPC ................. 250/390.01; 250/391; 250/390.02; 250/390.03

(58) Field of Classification Search
USPC ............................................. 250/390.01, 391
See application file for complete search history.

(56) References Cited

U.S. PATENT DOCUMENTS

| 6,452,992 | B1 * | 9/2002 | Umiastowski | 376/170 |
| 2005/0195931 | A1 * | 9/2005 | Maglich | 376/156 |
| 2009/0065693 | A1 * | 3/2009 | Safa | 250/310 |
| 2009/0321653 | A1 * | 12/2009 | Perticone et al. | 250/393 |

FOREIGN PATENT DOCUMENTS

| FR | 2 764 383 A1 | 12/1998 |
| FR | 2 871 896 A1 | 12/2005 |

OTHER PUBLICATIONS

Jallu, F. et al., "Photoneutron Production in Tungsten, Praseodymium, Copper and Beryllium by Using High Energy Electron Linear Accelerator," Nuclear Instruments & Methods in Physics Research, Section B: Beam Interactions with Materials and Atoms, vol. 155, No. 4, (1999), pp. 373-381.

(Continued)

Primary Examiner — David Porta
Assistant Examiner — Jeremy S Valentiner
(74) Attorney, Agent, or Firm — Nixon Peabody LLP

(57) ABSTRACT

A method for determining the spectral and spatial distribution of a braking photon flow along at least one direction in space (x, y, z), characterized in that the method comprises measuring the neutrons resulting from the impact of the braking photons (ph) on at least one conversion target which is moved in the direction (x, y, z) in space. The invention can be used for X-rays, medical imaging, tomography, etc.

7 Claims, 3 Drawing Sheets

(56) References Cited

OTHER PUBLICATIONS

Jallu, F. et al., "Fissile and Non-Fissile Element Separation in Concrete Radioactive Waste Drums Using the SIMPHONIE Method," Nuclear Instruments & Methods in Physics Research, Section B: Beam Interactions With Materials and Atoms, vol. 179, No. 2, (2001), pp. 267-278.

French Search Report in French Application No. FR 0858641, dated Oct. 2, 2009.
International Search Report and Written Opinion in International Application No. PCT/EP2009/067048, mailed May 12, 2010.

* cited by examiner

METHOD FOR DETERMINING THE SPECTRAL AND SPATIAL DISTRIBUTION OF BRAKING PHOTONS, AND RELATED DEVICE

CROSS REFERENCE TO RELATED APPLICATIONS OR PRIORITY CLAIM

This application is a National Phase of PCT/EP2009/067048, filed Dec. 14, 2009, entitled, "METHOD FOR DETERMINING THE SPECTRAL AND SPATIAL DISTRIBUTION OF BRAKING PHOTONS, AND RELATED DEVICE", and which claims priority of, French Patent Application No. 08 58641, filed Dec. 16, 2008, the contents of which are incorporated herein by reference in their entirety.

TECHNICAL FIELD AND PRIOR ART

The invention relates to a method for determining the spectral and spatial distribution of braking photons, and related device.

The invention may be used, for example, in the field of X-rays, medical imaging, tomography, the non-destructive characterisation of illicit materials, the production of neutron flows of high intensities, etc.

The production of neutrons by means of an electron accelerator is a known technique that makes it possible to attain high flows of neutrons. The production of neutrons from electrons takes place via a beam of photons: the electrons from the accelerator are directed to a first target, known as braking target, which emits photons and the photons thereby emitted are then directed to a second target, known as conversion target, which emits neutrons.

Within the scope of measurement techniques using such electron accelerators, it is necessary to have good knowledge of the spectral and spatial distribution of the photons emitted as well as the behaviour of the assembly formed of the detector and the acquisition electronics.

The method of the invention meets this need.

DESCRIPTION OF THE INVENTION

Indeed, the invention relates to a method for determining the spectral and spatial distribution, along at least one axis, of a braking photon flow which results from the interaction of pulses of electrons on a braking target, characterised in that the method comprises:

at a first point of the axis, a first neutron measurement which results from an integration of neutron detection and counting signals, each neutron detection and counting signal resulting from the impact of braking photons on a first conversion target centred on said first point, the first conversion target being sensitive to photons of energy substantially greater than a first energy threshold, the neutrons which participate in the formation of a detection and counting signal being detected and counted over a time range between two successive pulses of electrons, successive movements of the first conversion target at different points of the axis, a neutron measurement complying with the neutron measurement carried out at the first point of the axis being carried out at each of the different points of the axis, and a succession of neutron measurements complying with the measurements carried out at said first point and said different points, with the aid of a succession of different conversion targets associated with energy thresholds different to each other and different to the first energy threshold.

The invention also relates to a device for determining the spectral and spatial distribution, along at least one axis, of a braking photon flow which results from the interaction of pulses of electrons on a braking target, characterised in that it comprises:

an assembly for conversion and detection of neutrons constituted of at least two conversion targets each able to generate neutrons induced under the action of braking photons, each conversion target being sensitive to photons of energy substantially greater than an energy threshold different from one conversion target to the other, and a measurement unit which comprises one or more helium $^3$He detectors to detect and count the induced neutrons generated by each conversion target, the helium $^3$He detectors being contained in a neutron moderator, said neutron moderator being enveloped in an absorber of thermal neutrons, each conversion target being positioned, successively, on a face of the absorber of thermal neutrons which faces the braking target, an electronic processing circuit that processes the signals delivered by the neutron conversion and detection assembly, the electronic processing circuit comprising means for controlling the detection and the counting of neutrons over time ranges between two successive pulses of electrons, and means for moving the neutron conversion and detection assembly along the axis.

An advantage of the method of the invention is to provide the possibility of knowing and checking, on line, the correct operation and the non drift of the electron accelerator. The neutron measurement advantageously makes it possible to have knowledge of the stability of the beam of photons at least under its integral aspect, in other words its intensity and its energy (i.e. its power).

The method of the invention also makes it possible, in an advantageous manner, to attain the characteristics of the photonic component with the aid of the measurement of an induced neutron component (gain in contrast).

The good spatial characterisation of the flow of photons obtained by the method of the invention also makes it possible to optimise the conversion target intended to produce the neutrons.

Moreover, it is known that the direct interrogation, with the aid of a beam of braking photons, of a material to be characterised is of great interest. The correct characterisation of the beams of braking photons that the method of the invention enables advantageously makes it possible to obtain better results for the characterisation of materials. This makes it possible, in particular, to optimise the performance and to reduce the duration of the measurements and, as a consequence, to reduce the costs.

BRIEF DESCRIPTION OF DRAWINGS

Other characteristics and advantages of the invention will become clearer on reading a preferential embodiment made in reference to the appended figures among which.

In all the figures, the same references represent the same components.

DETAILED DESCRIPTION OF THE PREFERENTIAL EMBODIMENT OF THE INVENTION

Figure 1:
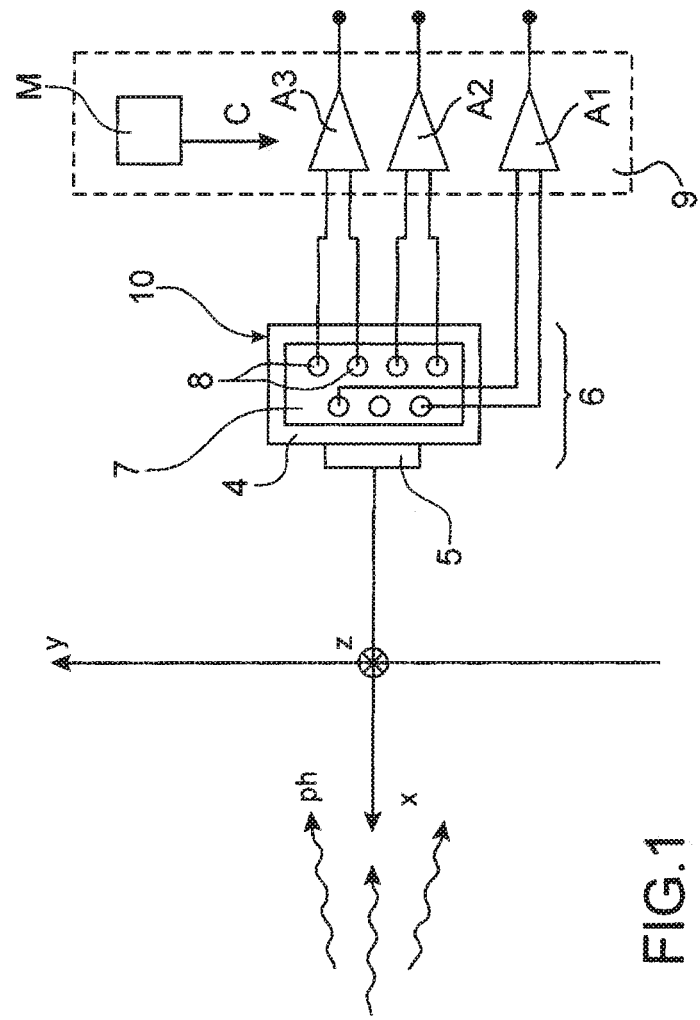
FIG. 1 represents a device for the implementation of the method of the invention.

FIG. 1 represents a device for the implementation of the method of the invention.

The device comprises means for creating braking photons and means for measuring, along at least one axis in space, the spectral and spatial distribution of the braking photons thereby created.

The means for creating braking photons are constituted of an electron accelerator 1 and a braking target 2 placed in a target holder 3. The accelerator 1 emits electrons e⁻ in the form of pulses. The frequency of the pulses is, for example, between 10 Hz and 300 Hz and the width of the pulses is, for example, equal to 4.5 µs. The electrons have an energy equal, for example, to 6 MeV, 9 MeV or 11 MeV. In interfering with the braking target 2, for example a tungsten target, the electrons produce braking photons ph.

The means for measuring the spectral and spatial distribution of the beam of photons are constituted of an assembly for conversion and detection of neutrons 6 and an electronic processing circuit 9. The neutron conversion and detection assembly 6 comprises at least two conversion targets 5 and a measurement unit 10, the conversion targets being placed separately, or one after the other, on the measurement unit 10. Each conversion target is able to generate neutrons when the conversion target is induced above a certain energy threshold by the beam of photons ph, the energy threshold associated with a target being different from one target to another. The measurement unit 10 measures the induced neutrons generated by each conversion target 5. The measurement unit 10 is constituted of one or more helium $^3$He detector(s) 8 contained in a neutron moderator 7, itself enveloped in an absorber 4 which absorbs the thermal neutrons (very low energy neutrons). The detector unit thus designed is then only sensitive to rapid neutrons and is consequently only very slightly affected by the environment and the moderating effects thereof on the neutrons.

Figure 2:
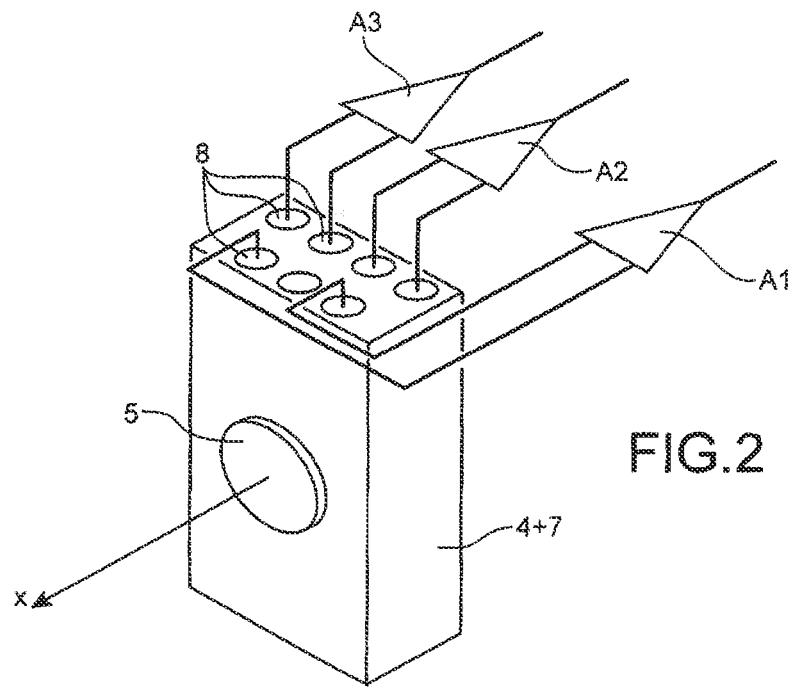
FIG. 2 represents a perspective view of a neutron measurement unit used in the device of the invention represented in FIG. 1.

The conversion target 5 is placed on a face of the absorber 4 which faces the braking target 2. As is illustrated in FIG. 2, the conversion target 5 is positioned in a centered manner on the face of the absorber 4 in order to optimise the detection of photons ph. The normal to the surface of the face 4 at the central point of the conversion target 5 defines an axis x. According to the preferential embodiment of the invention, the helium detectors 8 are grouped together in pairs and form three measurement channels, one front channel and two rear channels. The electronic processing circuit 9 is a rapid electronic circuit which comprises, for each measurement channel i (i=1, 2, 3), an ADSF type amplifier $A_i$ (i=1, 2, 3) (ADSF for "Amplificateur Discriminateur Seuil Fenêtre" (threshold window discriminator amplifier).

The neutron measurements are carried out over time intervals that make it possible to get away from braking photons emitted during the electronic pulses. In a preferential manner, said time intervals are also chosen in order to leave sufficient time to the neutron detectors and to the electronic processing circuits so that said detectors and said circuits recover all of their detection properties.

Indeed, the braking photons are produced quasi-instantaneously during the interaction of the electrons with the braking target 2. Braking photons are thus emitted with the same time distribution as the electrons, namely the same pulse width and the same repetition frequency. These braking photons are thus present during the whole width of the electronic pulses which vary, typically, from several microseconds to several tens of microseconds. During the electronic pulses, the neutron detectors are completely blinded by the photonic pulses that ensue from them and are, consequently, inoperative. It is only several tens of microseconds after the stoppage of a photonic pulse that the neutron detectors recover all of their properties. The measurement of the induced neutron component thus only takes place between the photonic pulses and, preferentially, in time ranges adapted so that not just the neutron detectors but also the processing electronics have recovered their detection properties. To this end, the electronic processing circuit 9 comprises means of control M which deliver a control C which, applied to the electronic detection circuits, inhibits the detection and the counting of neutrons outside of said time ranges. At a given position of the neutron conversion and detection assembly 6, a cycle of measurements is constituted of the integration of a succession of neutron detection and counting signals measured between the successive pulses of electrons.

By way of non limiting example, the measurements are carried out for a frequency of pulses of electrons equal to 90 Hz, 5400 measurement cycles are carried out and the acquisition time per measurement channel is equal to 10 µs.

Figure 3:
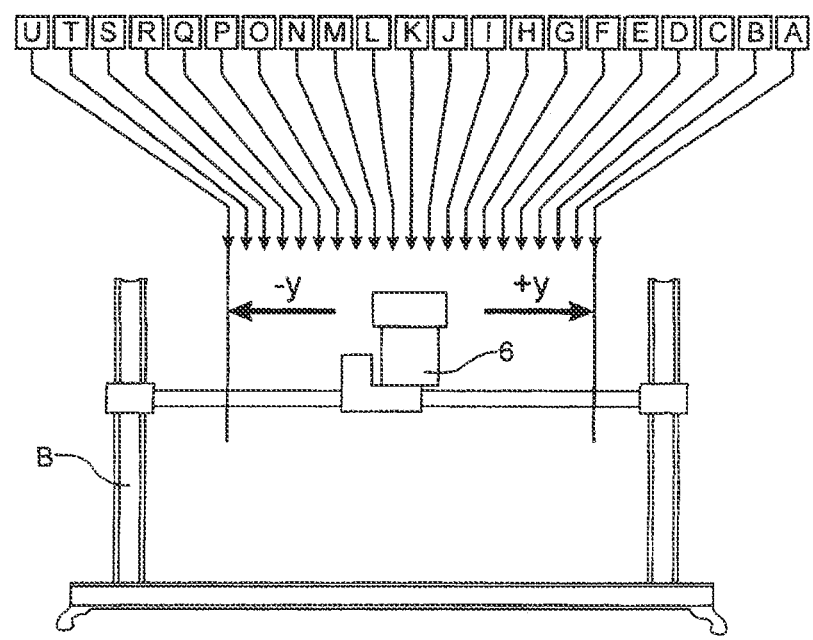
FIG. 3 represents an example of movement unit used for the implementation of the method of the invention.

Means enable the neutron conversion and detection assembly 6 to be moved along at least one axis in space. The movement takes place, for example, along at least one of the three perpendicular directions in space defined by the direct trihedron (x, y, z), the axis x being the axis defined previously. FIG. 3 represents, by way of example, a remotely controlled movement unit B which moves the neutron conversion and detection assembly 6 along the axis y by steps of 50 mm between a first end position A situated at −500 mm in relation to a central position of abscissa y=0 and a second end position U situated at +500 mm in relation to the central position.

The conversion target 5 is constituted of a material able to generate neutrons induced above a certain energy threshold of the beam of photons ph and, as a consequence, above a certain energy threshold of the electrons e⁻. Thus, different targets adapted to different energy thresholds of electrons are successively chosen to implement the method of the invention, then leading to determining the distribution of the flow of photons over a large energy range. The target 5 may be, for example, a uranium $^{238}$U target for energies of electrons greater than 6 Mev and a beryllium Be target for energies of electrons greater than 1.67 Mev.

Figure 4:
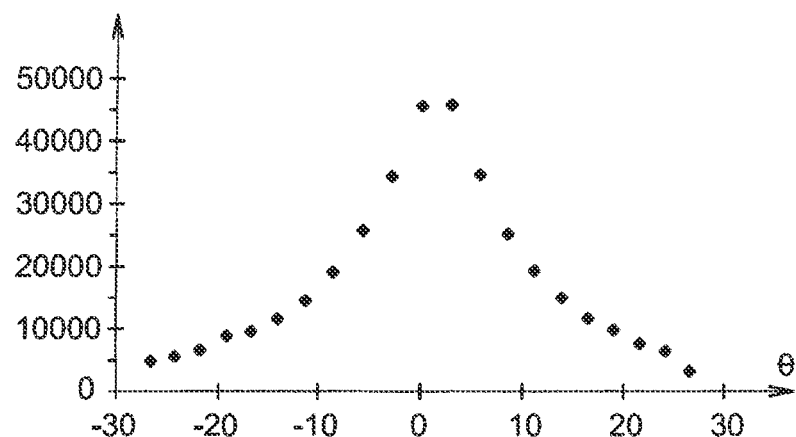
FIG. 4 represents an example of the spectral and spatial distribution of braking photons obtained by the method of the invention.

FIG. 4 represents an example of the spectral and spatial distribution obtained by the method of the invention. A helium $^3$H detector provided with a uranium $^{238}$U conversion target is moved in front of the braking target along the axis y, this being substantially 1 m distant from the braking target 2. The movement of the target takes place between the measurements −500 mm and +500 mm, by steps of 50 mm (see FIG. 3). The target is constituted of a uranium pellet of circular shape, the radius of which is substantially equal to 50 mm and the thickness substantially equal to 3 mm. The energy of the electrons is substantially equal to 9 MeV. FIG. 4 represents the number of counts detected by the helium detector as a function of the opening angle θ of the beam (angle between the x axis and the axis defined by the braking target 2 and the target 5).

Figure 5:
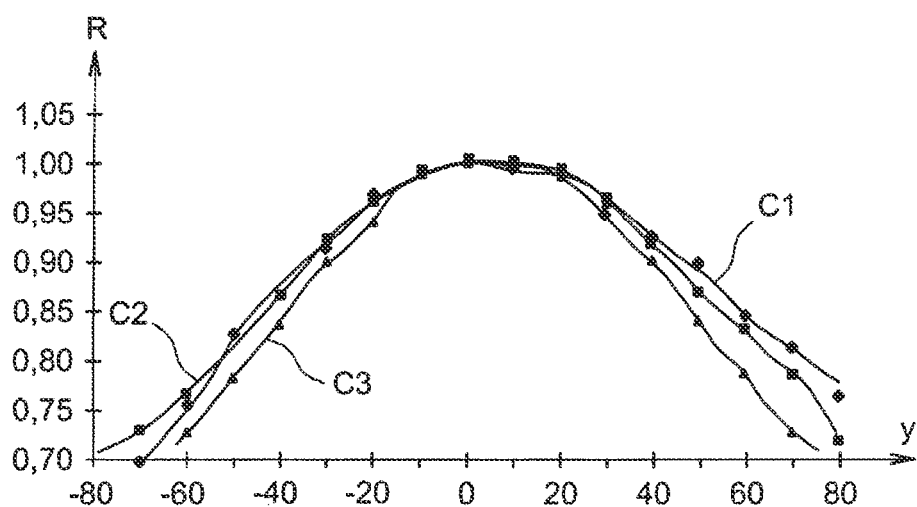
FIG. 5 represents, for different radiation energies of braking photons, a ratio R formed, for different normalised values of the measured signal, by the method of the invention.

FIG. 5 represents, for different energies of electrons, a ratio R formed by the different normalised values of the signal measured by the method of the invention, as a function of the movement of the measurement target (i.e. the conversion target). At a given position of the measurement device, the ratio R is equal to the value of the signal measured at the given position divided by the value of the maximum signal measured over all of the positions. The movement of the conversion target takes place along the axis y, this being substantially 1 meter distant from the braking target 2. The movement of the target takes place between the dimensions −80 mm and +80 mm, by steps of 10 mm. The curves C1, C2 and C3 correspond, respectively, to an energy of electrons equal to 6 MeV, 9 MeV and 11 MeV. The profile obtained is remarkably regular at all energies.

The results represented in FIGS. 4 and 5 concern the case where the conversion target 5 is a uranium $^{238}$U target, As has already been mentioned previously, such a target is preferentially used for electron energies greater than or equal to 6 MeV which is the threshold energy of the $^{235}$U isotope, For energy values below 6 MeV, other targets are used, for example beryllium Be targets.

The measured neutron signal, which results from the interaction of the photons with the conversion target, is drowned in a neutron signal inherent in the operation of the accelerator. It is thus desirable to carry out a counting of the neutrons in the absence of target in order to measure the noise that represents the operating neutron signal of the accelerator, said noise then being subtracted from the useful signal. To this end, the electronic processing circuit which is connected to the measurement unit 6 comprises circuits able to memorise the measurements carried out and to calculate the difference between the signals measured respectively in the presence and in the absence of conversion target.

The invention claimed is:

1. Method for determining the spectral and spatial distribution, along at least one axis, of a braking photon flow which results from the interaction of pulses of electrons on a braking target, characterized in that said method comprises the following steps:
    placing each conversion target of a succession of conversion targets, one after the other, on a measurement unit which faces the braking photon flow and, for each conversion target of said succession of conversion targets,
    moving said measurement unit along said axis so that said each conversion target is placed successively at different points of said axis and, for each point of said axis, carrying out a neutron measurement complying with a neutron measurement carried out at a first point of the axis, the neutron measurement resulting from an integration of neutron detection and counting signals, each neutron detection and counting signal resulting from the impact of said braking photons (ph) on said each conversion target, said each conversion target being sensitive to photons of energy substantially greater than a first energy threshold, the neutrons that participate in the formation of a detection and counting signal being detected and counted over a time range between two successive pulses of electrons.

2. Method according to claim 1, wherein a first conversion target is a beryllium target having a first energy threshold and a second conversion target is a uranium $^{238}$U target having a second energy threshold of value greater than the value of the first threshold.

3. Method according to claim 1 further comprising a calibrating process wherein said calibrating process comprises the measuring of a neutron signal inherent in the operation of an electron accelerator which creates braking photons by interaction of the electrons with the braking target is measured, in the absence of conversion target, over the time range and at each point of the axis, and subtracting the measurement of the neutron signal inherent in the operation of the electron accelerator is subtracted from the neutron detection and counting signal measured in the presence of each conversion target.

4. Method according to claim 1, wherein the detection and counting signals are measured by a helium $^{3}$He detector unit.

5. Device for determining the spectral and spatial distribution, along at least one axis, of a braking photon flow which results from the interaction of pulses of electrons on a braking target, characterised in that it comprises:
    an assembly for conversion and detection of neutrons constituted of at least two conversion targets each able to generate neutrons induced under the action of braking photons, each conversion target being sensitive to photons of energy substantially greater than an energy threshold different from one conversion target to the other, and of a measurement unit that comprises one or more helium $^{3}$He detectors to detect and count the induced neutrons generated by each conversion target, the helium $^{3}$He detectors being contained in a neutron moderator, said neutron moderator being enveloped in an absorber of thermal neutrons, each conversion target being positioned, one after the other, on a face of the absorber of thermal neutrons which faces the braking target,
    an electronic processing circuit which processes the signals delivered by the neutron conversion and detection assembly, said electronic processing circuit comprising means for controlling the detection and the counting of neutrons over time ranges between two successive pulses of electrons, and
    means (B) for moving the neutron conversion and detection assembly along the axis.

6. Device according to claim 5, wherein the means (B) for moving the neutron conversion and detection assembly along the axis are constituted of a remotely controlled movement unit (B).

7. Device according to claim 5, wherein a first conversion target is a beryllium target having a first energy threshold and a second conversion target is a uranium $^{238}$U target having a second energy threshold greater than the first threshold.

\* \* \* \* \*

UNITED STATES PATENT AND TRADEMARK OFFICE
CERTIFICATE OF CORRECTION

PATENT NO. : 8,610,080 B2
APPLICATION NO. : 13/139700
DATED : December 17, 2013
INVENTOR(S) : Lyoussi et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 77 days.

Signed and Sealed this
Twenty-second Day of September, 2015

Michelle K. Lee
*Director of the United States Patent and Trademark Office*